United States Patent
Li et al.

(10) Patent No.: US 12,395,936 B2
(45) Date of Patent: Aug. 19, 2025

(54) METHOD FOR WIRELESS DATA RECEPTION, AND WIRELESS DEVICE

(71) Applicant: Realtek Semiconductor Corp., Hsinchu (TW)

(72) Inventors: ZhaoMing Li, Suzhou (CN); ZuoHui Peng, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 408 days.

(21) Appl. No.: 17/828,107

(22) Filed: May 31, 2022

(65) Prior Publication Data

US 2023/0007588 A1    Jan. 5, 2023

(30) Foreign Application Priority Data

Jul. 5, 2021    (CN) .......................... 202110758052.5

(51) Int. Cl.
*H04W 52/02*    (2009.01)
*H04W 56/00*    (2009.01)

(52) U.S. Cl.
CPC ... *H04W 52/0229* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 7,593,378 B1* | 9/2009 | Murali | H04W 52/0245 455/574 |
| 8,879,452 B2* | 11/2014 | Liu | H04W 48/12 370/328 |
| 9,232,473 B2 | 1/2016 | Abraham et al. | |

(Continued)

FOREIGN PATENT DOCUMENTS

| | | |
|---|---|---|
| CN | 102740430 A | 10/2012 |
| CN | 104247302 A | 12/2014 |

(Continued)

OTHER PUBLICATIONS

A. Mahmood et al., "Clock Synchronization over IEEE 802.11—A Survey of Methodologies and Protocols," IEEE Transactions on Industrial Informatics, vol. 13, No. 2, pp. 907-922, Sec. IV.B. (Year: 2017).*

(Continued)

*Primary Examiner* — Moo Jeong
*Assistant Examiner* — Garth D Richmond
(74) *Attorney, Agent, or Firm* — McClure, Qualey & Rodack, LLP

(57) ABSTRACT

The application proposes a method for wireless data reception and a wireless device, adaptable for the wireless device to receive data from an access point. Firstly, a transceiver of the wireless device is switched on at the target beacon transmission time. Thereafter, a first portion of a beacon is received, wherein a length of the first portion is less than a complete length of the entire beacon, and the first portion comprises a time stamp and a TIM. Finally, it is determined (Continued)

whether a data packet needs to be received according to the TIM. If it is determined that there is no data packet to receive, the transceiver of the wireless device is switched off without completing the reception of the entire beacon.

10 Claims, 6 Drawing Sheets

(56) References Cited

U.S. PATENT DOCUMENTS

| | | | |
|---|---|---|---|
| 9,462,549 B2 | 10/2016 | Alon et al. | |
| 9,538,552 B2 | 1/2017 | Choi et al. | |
| 9,668,212 B2* | 5/2017 | Lee | H04L 1/1671 |
| 9,848,384 B2* | 12/2017 | Chari | H04L 5/0007 |
| 10,728,851 B1* | 7/2020 | Konradsson | H04W 48/20 |
| 11,160,013 B2 | 10/2021 | Choi et al. | |
| 2004/0008661 A1* | 1/2004 | Myles | H04J 3/0664 370/350 |
| 2008/0107156 A1* | 5/2008 | Wentick | H04B 1/713 375/E1.034 |
| 2009/0247094 A1* | 10/2009 | Sakoda | H04W 16/14 455/78 |
| 2012/0268250 A1* | 10/2012 | Kaufman | H04W 4/80 340/10.1 |
| 2013/0044739 A1* | 2/2013 | Huang | H04W 52/0216 370/338 |
| 2014/0293992 A1* | 10/2014 | Abraham | H04W 52/0225 370/350 |
| 2016/0071404 A1* | 3/2016 | Chiarizio | H04W 56/0055 340/577 |
| 2020/0221382 A1 | 7/2020 | Konradsson et al. | |
| 2022/0417850 A1* | 12/2022 | Sandgren | H04W 56/0015 |

FOREIGN PATENT DOCUMENTS

| | | |
|---|---|---|
| CN | 104429006 A | 3/2015 |
| CN | 108696324 A | 10/2018 |
| CN | 111182610 A | 5/2020 |
| EP | 3322229 A1 | 5/2018 |
| TW | 201603608 A | 1/2016 |
| WO | 2019164770 A1 | 8/2019 |

OTHER PUBLICATIONS

IEEE Standard for Information Technology 802.Nov. 2020, LAN/MAN Standards Committee of the IEEE Computer Society Dec. 3, 2020, pp. 2729-2739 (Year: 2020).*

TW Office Action dated May 10, 2022 in Taiwan application No. 110128806.

* cited by examiner

METHOD FOR WIRELESS DATA RECEPTION, AND WIRELESS DEVICE

CROSS REFERENCE TO RELATED APPLICATION

This application claims the priority benefit of Chinese Patent Application Serial Number 202110758052.5, filed on Jul. 5, 2021, the full disclosure of which is incorporated herein by reference.

BACKGROUND

Technical Field

The application is related to a method for wireless data reception, and particularly, to an optimized power saving method for wireless data reception.

Related Art

Wireless network (e.g., IEEE 802.11, wireless fidelity; Wi-fi) is widely adapted in present life, with applications including laptops, bracelets, watches, and even small Internet of things (IOT) devices powered by batteries. Wireless transceivers, however, generally render significant power consumption in standby mode or sleep mode, which undesirably reduces the maximum service time of the battery powered devices.

In a wireless network system, when a connection is established between a wireless device (node; station; STA) and an access point (AP), data can be transmitted therebetween. To save power, wireless devices may switch off (disable) the transceiver to enter into a sleep mode when there is no pending data packet to be transmitted to received. While the wireless device is switched to the sleep mode, the access point may store data frames bound for the wireless device in a buffer. When there are buffered data frames in the access point, the access point may notify the wireless device through a traffic indication map (TIM) in the periodically broadcasted beacon. The wireless device is configured to switch on (enable) the transceiver periodically so as to receive beacons. When a beacon is received, the wireless device may check the TIM in the beacon to determine whether there is a buffered data frame in the access point pending for the wireless device to receive. If there is no buffered frame in the access point to be transmitted to the wireless device, the wireless device may switch off the transceiver (or RF module) again until next beacon is transmitted from the access point.

FIG. 1 shows a beacon frame structure based on the prior art, including the following fields.

| Field | Transmission time |
|---|---|
| Preamble | Fixed 128 microseconds (μs) |
| Start Frame Delimiter (SFD) | Fixed 16 microseconds |
| Physical header (PHY) | Fixed 48 microseconds |
| Frame body | The length is generally 200~400 bytes. With complementary code modulation (CCK) in 1 million bit rate (1 Mbps), the transmission time is generally 1600 microseconds to 3200 microseconds |

In conventional implementations for power saving, the wireless device must receive an entire beacon frame so as to determine the integrity (correctness) of the beacon through the Frame Check Sequence (FCS), and thereafter determine whether to switch off (disable) the transceiver according to the correct TIM message in the entire beacon frame. The elapsed time to receive the entire beacon frame is subsequently 3 milliseconds (ms). In other words, even if the TIM message indicates that there is no buffered frame in the AP to be transmitted, the wireless device (STA) still has to wait until the entire beacon frame is successfully received with validity of the beacon determined before the transceiver (or RF module) can be switched off (disabled). Therefore, the conventional implementation for power saving of the wireless device may still waste significant power.

SUMMARY

The embodiment of the application provides a method for wireless data reception and a wireless device implementing the method to solve the problem of excess power consumption in the prior art.

Experiments has found that in the process of frame body reception, sufficient information has been acquired to determine whether there is buffered packet pending for reception upon reception of the TIM in the beacon. Therefore, a method for wireless data reception to save power for wireless devices is proposed.

To enable a wireless device to receive data from the access point in a power efficient manner, an embodiment of wireless data reception is implemented in the following steps. Firstly, at a target beacon transmission time (TBTT), a transceiver of the wireless device is switched on. Thereafter, the wireless device receives a first portion of a beacon, wherein a length of the first portion is less than the length of the entire beacon, and the first portion comprises a time stamp and a TIM. The wireless device then determines whether to receive data packets according to the TIM.

If the TIM indicates that there is no buffered data packet to receive, the transceiver is switched off without completely receiving the entire beacon. Therefore, effective power saving is accomplished.

On the other hand, when the TIM indicates that a data packet is buffered for reception, the entire beacon is completely received, which comprises a frame check sequence.

In a further embodiment, after acquiring the entire beacon, an integrity of the entire beacon is verified according to the frame check sequence. If verification of the integrity of the beacon fails, the transceiver of the wireless device is switched off.

On the other hand, if the integrity of the beacon is verified, a local time synchronization can be further performed according to the time stamp, and then the data packet can be received. Upon completion of the data packet reception, the transceiver of the wireless device may be switched off.

In a further embodiment, when the TIM indicates that there is no buffered data packet to receive, and the offset exceeds the threshold, the wireless device receives the entire beacon, and verifies the integrity of the entire beacon according to the frame check sequence. In the case that the verification of the integrity of the entire beacon fails, the transceiver of the wireless device is switched off.

On the other hand, if the beacon is correctly verified, the local time synchronization can be performed according to the time stamp, and the data packet can be received. The transceiver of the wireless device may be switched off upon completion of the data packet reception.

In a further embodiment, the wireless device may interpret one or more element identifiers (ID) in the first portion to find out a TIM information element (TIM IE). The aforementioned TIM is referred to as a bit map in the TIM IE.

In another aspect of the invention, an embodiment of a wireless device is proposed, for receiving data from a remote device. A transceiver transmits and receives wireless signals. A time synchronization circuit is configured to perform a local time synchronization. A control circuit is coupled to the transceiver, configured to disable or enable the transceiver. The control circuit enables the transceiver at a target beacon transmission time to receive a first portion of a beacon, wherein the beacon comprises the first portion and a second portion, wherein the first portion comprises a time stamp and a traffic indication map and the second portion comprises a frame check sequence. The control circuit determines whether to receive a buffered data packet in the remote device according to the traffic indication map. When the control circuit determines that there is no buffered data packet in the remote device, the control circuit is configured to disable the transceiver from receiving the second portion of the beacon.

Another aspect of the invention is a method for receiving a beacon from a remote device, applicable to a wireless device. A transceiver of the wireless device is enabled at a target time, A first portion of the beacon is received, wherein the beacon comprises the first portion and a second portion, the first portion comprises a traffic indication signal, and the second portion comprises a frame check sequence. It is determined whether there is data packet buffered in the remote device for transmission to the wireless device according to the traffic indication signal. When there is no data packet buffered in the remote device for transmission to the wireless device, disabling the transceiver of the wireless device before the beacon has been fully received.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
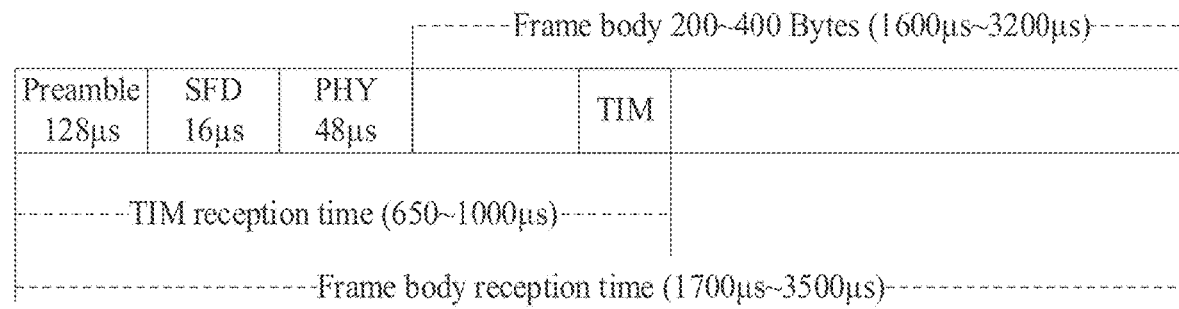
FIG. 1 shows a conventional beacon frame structure.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "substantial/substantially" means, within an acceptable error range, the person skilled in the art may solve the technical problem in a certain error range to achieve the basic technical effect.

The following description is of the best-contemplated mode of conducting the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

The technical scheme in the embodiment of the application will be clearly and completely described below in combination with the accompanying drawings in the embodiment of the application. Obviously, the described embodiments are part of the embodiments of the application, not all of the embodiments. Based on the embodiments in the application, all other embodiments obtained by those skilled in the art without creative work belong to the scope of protection of the application.

In the conventional implementations of power saving mode, the wireless device STA must receive an entire beacon frame to decide whether to switch off the transceiver. However, Applicant has experimentally determined that the wireless device STA can decide whether to switch off the transceiver without finishing the reception of an entire beacon frame. After acquiring the TIM in the beacon frame, the wireless device STA can decide whether to switch off the transceiver, so as to significantly save the receiving time and achieve the purpose of saving power. Therefore, the proposed embodiments are described in detail hereafter.

Figure 2:
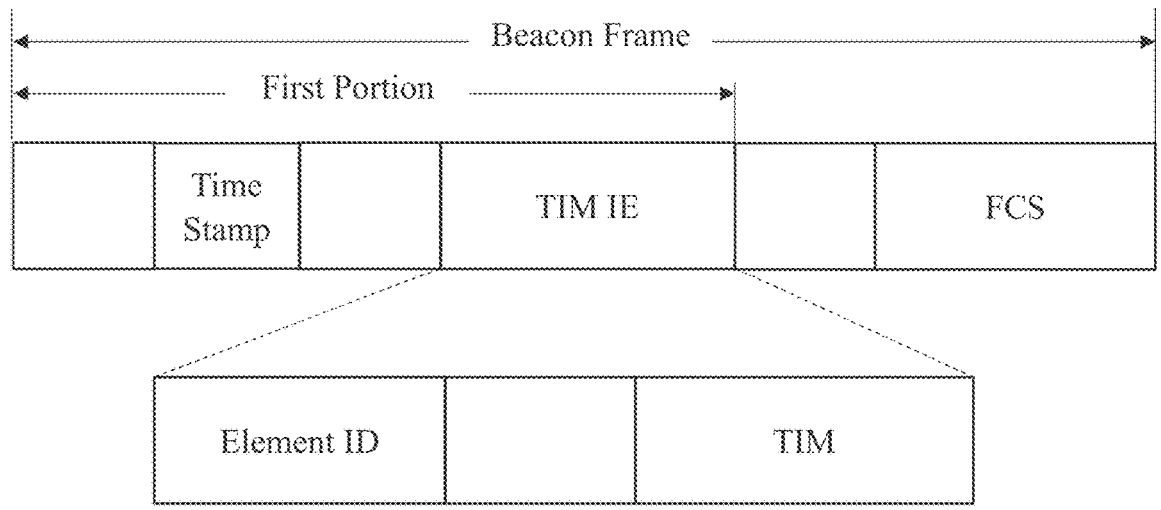
FIG. 2 shows a structure of a beacon frame and details of a TIM IE.

FIG. 2 shows the structure of a beacon frame and the details of the TIM IE. A frame check sequence (FCS) is configured at the end of the beacon frame for a cyclic redundancy check (CRC) which determines integrity of the beacon frame. If the CRC is correct, the software or hardware may locate the TIM IE according to element IDs in the beacon frame, and determines whether there are buffered data packets to receive according to particular field values in the TIM IE, including the TIM (i.e., a partial virtual bit map). If buffered data packets exist, the wireless device STA may trigger the access point to send data packets by sending a PS poll request frame or a null request frame. In the receiving process according to the embodiment as shown in FIG. 1, only a portion of the beacon frame is needed to determine whether to enter the power saving mode. The portion of the beacon frame comprises at least a time tamp and a TIM. Specifically, the TIM can be determined according to an element ID in the TIM IE during reception. In other words, the proposed method for wireless data reception in the embodiment omits unneeded data after the TIM, such that significant amount of unneeded data is not received, allowing the wireless device to enter the power saving mode early.

Figure 3:
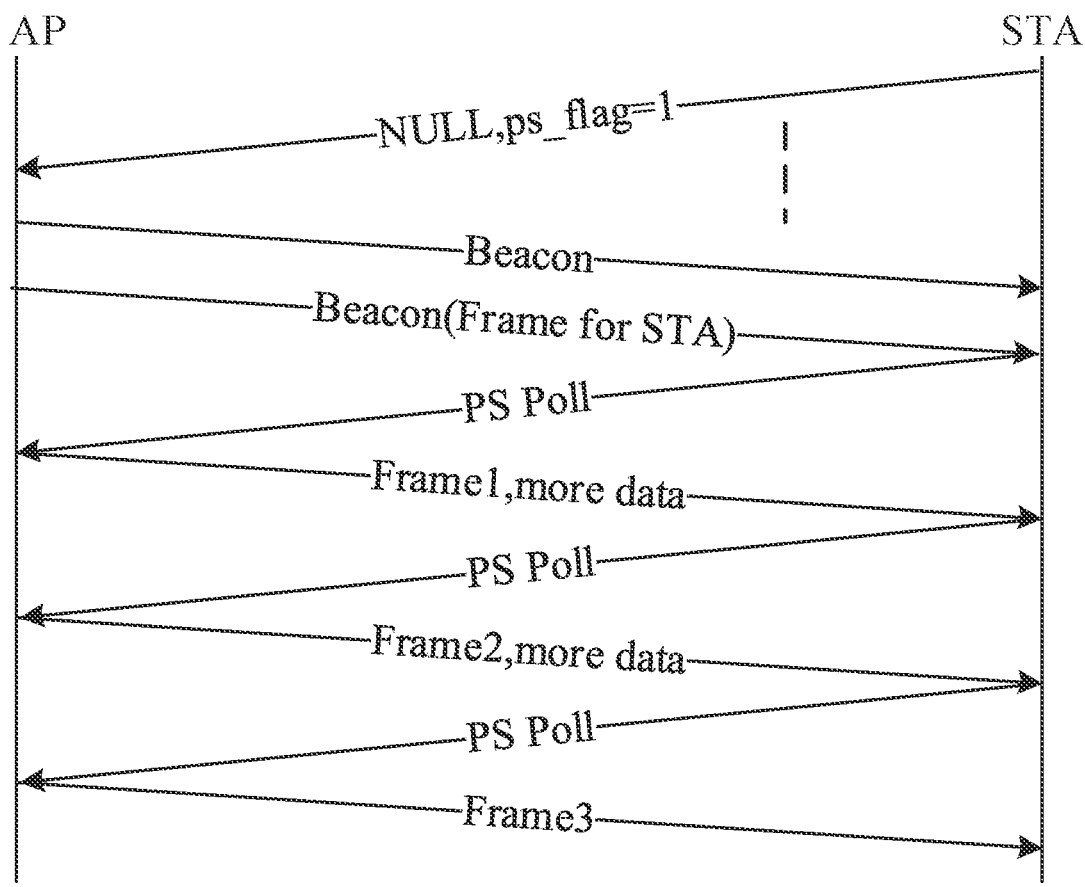
FIG. 3 is a flowchart of receiving data packets buffered by the access point using a power-saving (PS) poll request frame.

FIG. 3 is a flowchart of receiving data packets buffered in the access point using a PS poll request frame. The wireless device STA notifies the access point that after entering the sleep mode, the wireless device STA will periodically wake up and listen to the beacon. When the TIM indicates that there are data packets to be received, the wireless device STA may send a PS poll request frame to trigger the access point to send the buffered data packets. The wireless device STA may determine whether to continue to send the PS poll request frame to trigger transmission of further data frames (frame1, frame2, frame3) according to a more data field carried in the data packet. The wireless device STA will not switch off its radio frequency (RF) module until the more data field in the received packet is 0. On the other hand, in the power saving mode, the RF module will not wake up again until the next TBTT.

Figure 4:
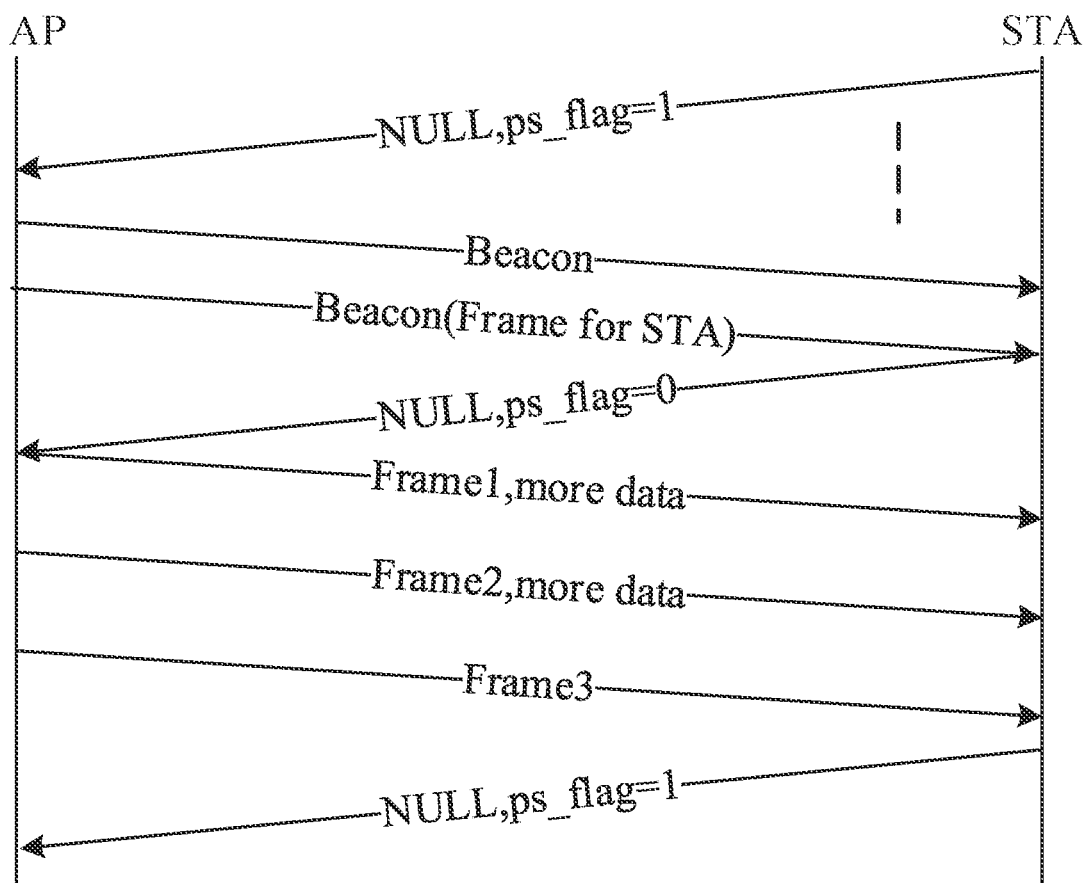
FIG. 4 is a flowchart of receiving data packets buffered by the access point using a null request frame.

FIG. 4 is the flow of receiving the data packets buffered by the access point using a null data request frame. After the wireless device STA notifies the access point that it enters the sleep mode, the wireless device will periodically wake up to listen to the beacon, and send a null data frame with PS_flag 0 when the TIM indicates that there are data packets to be received. In response to the null data frame with PS_flag 0 sent to the access point, the access point will send all data packets to the wireless device STA. After receiving all data packets, the wireless device STA will send a null data frame with PS_flag 1 to the access point, and switch off the RF module. Until the next TBTT, the RF module is switched on again to receive the next beacon.

Figure 5:
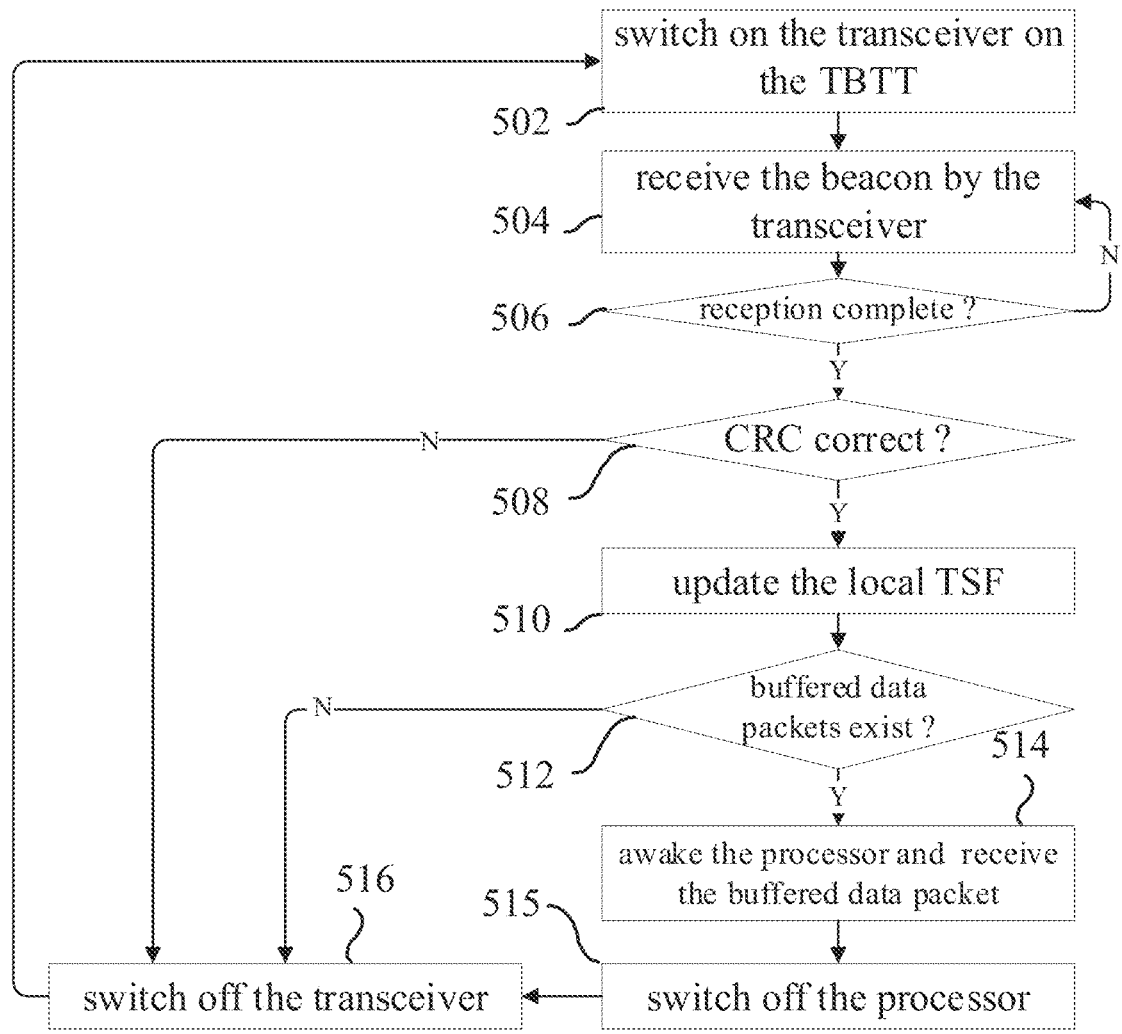
FIG. 5 shows conventional TIM analysis and transceiver switching.

FIG. 5 shows conventional TIM analysis and transceiver mode switching. The wireless device STA establishes a connection with the access point. During the connection, both parties may agree on a listen interval, based on which, the wireless device STA wakes up regularly and switches on the transceiver to receive beacons periodically broadcasted by the access point. When the wireless device STA has no data to transmit or receive, it will pass a null data frame with a power-saving flag PS_flag 1 to inform the access point that the wireless device STA is about to enter the power saving mode. The wireless device STA then switches off the transceiver, and periodically switches on the transceiver according to the listening interval to receive next beacons.

The time synchronization between the access point and the wireless device STA is implemented by the time stamp in the beacon and a local time synchronization (TSF) timer for synchronization.

The following embodiment shows a process when a beacon is received.

In step 502, the transceiver is switched on at the TBTT. In step 504, the entire beacon frame is received, and the reception is concluded in step 506. In step 508, a cyclic redundancy check (such as FCS check, address check, etc.) is performed to determine the integrity of the beacon. If the integrity of the beacon is valid, proceed to step 510. Conversely, if the integrity of the beacon is compromised, the transceiver (RF module) is switched off in step 516, and the process returns to step 502 to wait for next TBTT. In step 510, a local TSF is updated, and the TIM is checked. In step 512, The TIM is interpreted to determine whether there are buffered data packets pending for reception. If yes, the process goes to step 514, wherein the processor is awakened, and the buffered data packets are received through the transceiver. Until all packets are received, the processor is switched off in step 515. If there are no buffered data packets, or step 515 is completed, the process goes to step 516, wherein the transceiver is switched off, and finally, the process returns to step 502 to wait for the next TBTT.

It can be seen from the conventional implementation of power saving, to determine the integrity of the beacon, the wireless device STA must receive the entire beacon. Consequently, the timing to determine whether to switch off the transceiver (RF module) is deferred.

Figure 6:
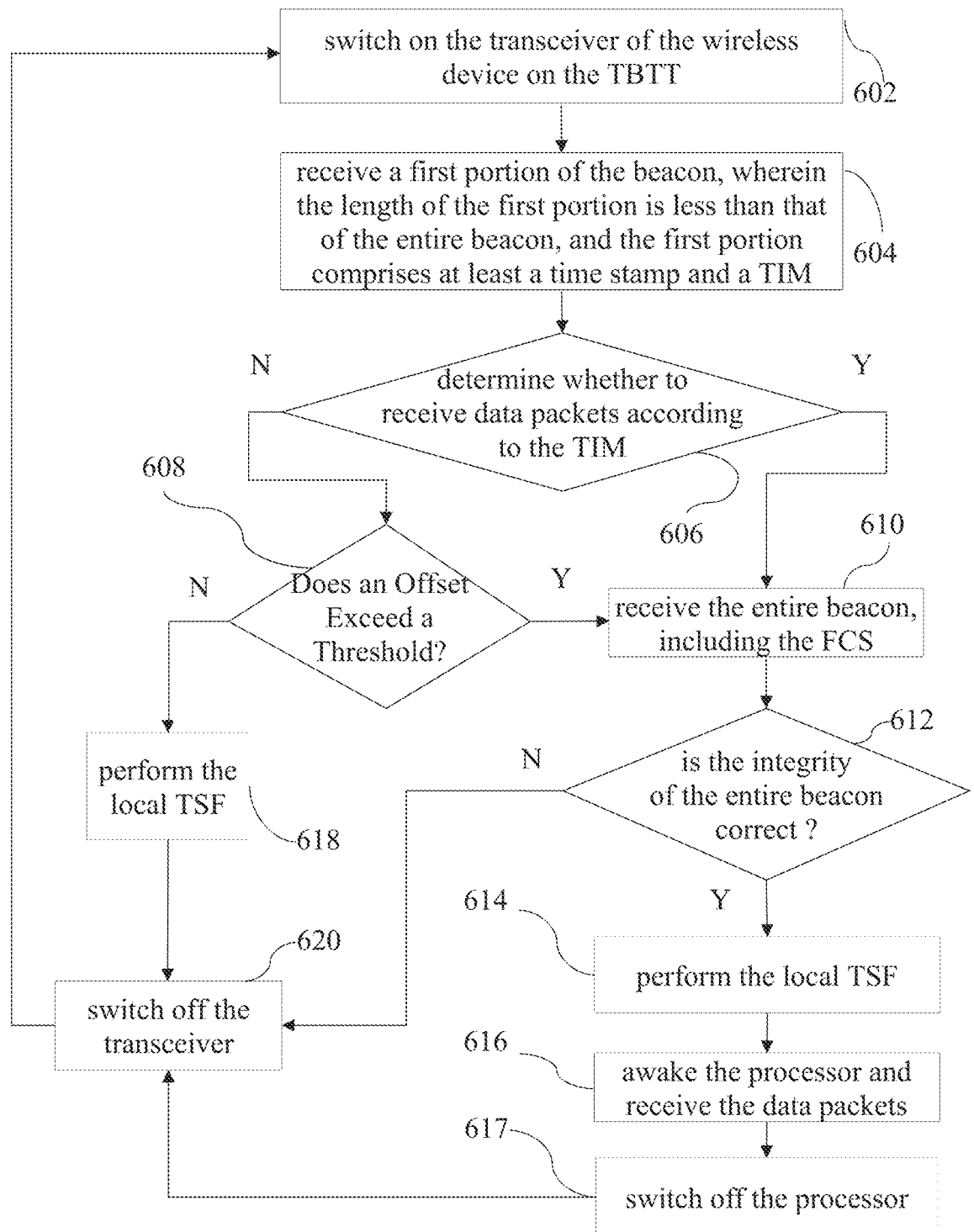
FIG. 6 shows TIM analysis and transceiver switching according to an embodiment of the present application.

FIG. 6 shows the TIM analysis and transceiver mode switching according to an embodiment of the present invention.

In step 602, the wireless device may set a TBTT to periodically enable the transceiver of the wireless device. By design, if without accident, the access point is expected to transmit a beacon frame on the TBTT. In implementation, the transceiver may be enabled by powering on or switching on the transceiver.

In the process of receiving the beacon, the embodiment of the invention only needs a portion of the beacon to respond, and does not need to receive the entire beacon. For example, in step 604, the wireless device receives a first portion of the beacon, wherein the length of the first portion is less than the length of the entire beacon, and the first portion comprises at least a time stamp and a TIM.

In step 606, the wireless device then determines whether to receive data packets according to the TIM. The embodiment is characterized in that if the wireless device determines that there is no need to receive data packets, the transceiver of the wireless device can be switched off without completely receiving the entire beacon, such that the efficiency of power usage is increased.

The embodiment, however, does not perform the CRC verification when checking the TIM in step 606, therefore exception handlers are required in case the integrity of the beacon is compromised during reception. In the first case, the access point may have buffered data packets, but the wireless device STA falsely determines that there are no data packets. In this case, the wireless device STA will not trigger the access point to send the buffered data packets, resulting in that the buffered data packets cannot be received in the current cycle. Even so, as long as the wireless device STA can correctly receive the beacon in the subsequent cycle, the data packet can be eventually delivered without data loss. In the second case, the access point does not contain any buffered data packet, but the wireless device STA falsely acknowledges that there are buffered data packets. In this case, the process falls back to the conventional steps, wherein the entire beacon will be completely received, and the CRC will be performed. The wireless device will acknowledge correct information from the entire beacon indicating that the access point does not cache data packets. The embodiment is proven effective and does not compromise the conventional protocol.

In a further embodiment, when the wireless device determines that there is no need to receive data packets according to the TIM, it can further proceed to step 608 to check whether the time stamp is synchronize with the local time in the wireless device. In other words, it is checked whether an offset between the time stamp and the local time of the wireless device exceeds a threshold. The reason for considering the time offset here is that the time stamp in the beacon in this step skipped the step of checking the FCS. If a huge time discrepancy exists, it is likely that the content of the beacon frame is incorrectly received. In this case, the process may fall back to the conventional steps, to receive the entire beacon frame, and proceed to subsequent steps based on the CRC verification of the FCS in the end of the beacon frame.

If the offset does not exceed the threshold value, first proceed to step 618 to perform the local time synchronization according to the time stamp, and then proceed to step 620 to switch off the transceiver of the wireless device.

On the other hand, if the wireless device determines that a packet needs to be received in step 606, the process goes to step 610 to completely receive the entire beacon, wherein the entire beacon comprises a frame check sequence (FCS). In step 612, after acquiring the entire beacon, the wireless device can determine the integrity of the beacon according to the FCS. If step 612 finds that the beacon is incorrect, it directly jumps to step 620 to switch off the transceiver of the wireless device.

On the other hand, if the beacon is correct, the process goes to step 614 to perform the local time synchronization according to the time stamp. Finally, in step 616, the processor is awakened to receive the data packet through the transceiver. In step 617, after receiving the data packet, the processor can be switched off or switched to the sleep mode, the power saving mode, the standby mode, or any other inactive modes. Finally, step 620 is performed to switch off the transceiver of the wireless device.

After step 620, the process repeats step 602, so that the cycle continues. With the embodiment described, the advantages are summarized herein: since the amount of data of the received beacon is reduced, the wake-up time of the transceiver and the processor can be further reduced. For wireless devices maintaining in standby mode for a long time, it can significantly reduce power consumption and prolong the battery time.

In a further embodiment, the TIM IE is found from the first portion of the beacon by the wireless device interpreting one or more element identifiers in the first portion of the beacon. The TIM IE contains the TIM as a bit map.

Compared with the prior art, the proposed embodiments can switch off the transceiver earlier, so as to save a lot of unnecessary beacon receiving time and a lot of power. The effect of power conservation is particularly outstanding when the wireless device remains idle for a long time.

The aforementioned embodiments suggest a wireless device receiving data from the access point. In a further embodiment, the access point can be substituted by any other remote device compliant to the Wi-Fi transmission protocol. That is, the wireless device as described in not limited to be receiving data from the access point.

Figure 7:
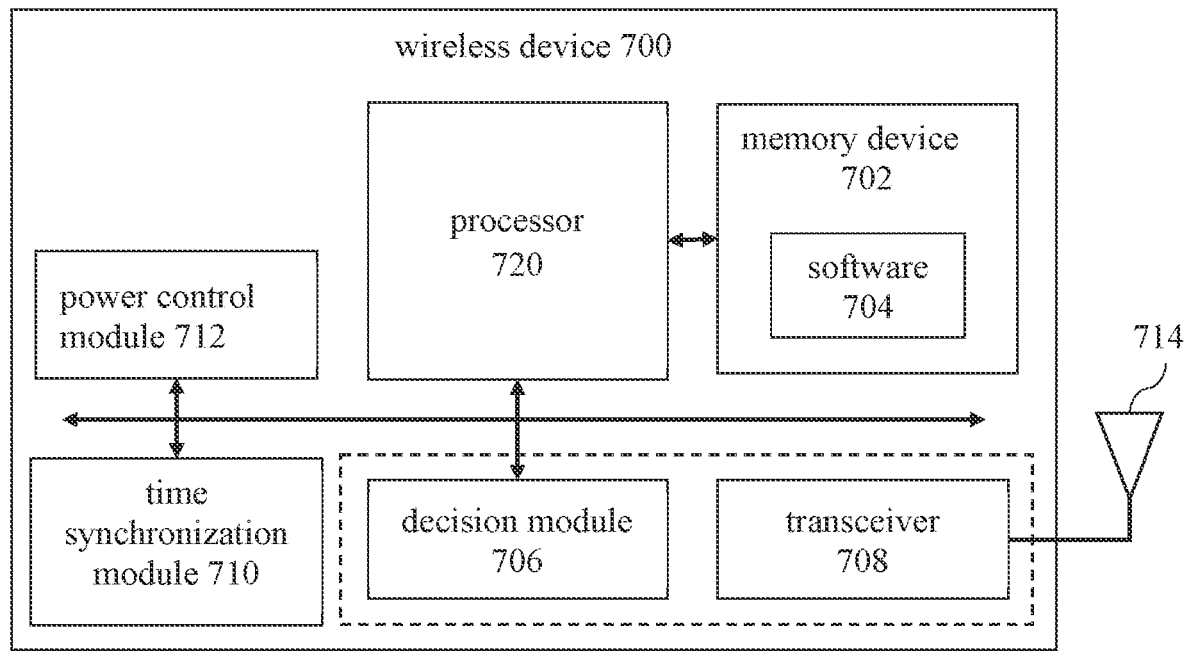
FIG. 7 shows an architecture diagram of a wireless device 700 according to one embodiment of the present invention.

FIG. 7 shows an architecture diagram of a wireless device 700 according to one embodiment of the present invention. Specifically, the wireless device can be any mobile device that supports Wi-Fi communication, such as a mobile phone or a computer. The wireless device 700 comprises at least a transceiver 708, also known as a radio frequency module, which can be connected with an antenna 714 to transmit and receive wireless signals. The time synchronization module 710 provides a time synchronization function. A power control module 712 is configured to control the power switch of the transceiver 708. A memory device 702 is configured for storing software 704 or program codes. The processor 720 executes the program in the memory device 702 and controls the overall operation of the wireless device 700 to implement the wireless data reception. It is worth mentioning that although the modules in the wireless device 700 are described as logical functions, they can be physically different hardware circuit designs or integrated circuit designs. For example, the power control module 712 may use a hardware circuit to determine the power switch of the transceiver 708 through simple signal control without the need for the processor 720. The wireless device 700 of the present embodiment may further include a decision module 706, which may be composed of a programmable logic circuit design with lower complexity than the processor 720, and has simple logic operation and judgment functions. When the wireless device 700 or the processor 720 enters the sleep mode or power saving mode, the decision module 706 maintains crucial functions with minimum power consumption, such as packet verification, time synchronization, power control, and packet transmission/reception.

In implementation, the decision module 706 may be implemented by a control circuit, coupled to the transceiver 708, and configured to disable or enable the transceiver 708. The time synchronization module 710 may be implemented by a time synchronization circuit. In an embodiment, the beacon sent from a remote device may comprise a first portion and a second portion, wherein the remote device may be an access point.

For example, the decision module 706 enables the transceiver 708 at a target time. In implementation, the transceiver 708 is enabled by the power control module 712 powering on the transceiver 708. The target time may be a TBTT. The transceiver 708 receives a first portion of the beacon, wherein the length of the first portion is less than the length of the entire beacon, the first portion comprises a time stamp and a traffic indication signal, and the second portion comprises a frame check sequence. The traffic indication signal may be a TIM.

At this time, the wireless device 700 or the processor 720 may be in a sleep mode or a power saving mode, and the decision module 706 can operate with low power to maintain the beacon reception and judgment function. For example, the decision module 706 may determine whether a packet needs to be received according to the TIM. If the decision module 706 determines that there is no need to receive the data packet, the decision module 706 disables the transceiver 708 without completing the reception of the beacon, so as to further save the power of the wireless device 700. In an embodiment, the decision module 706 disables the transceiver 708 from receiving the second portion of the beacon by instructing the power control module 712 to switch off the transceiver 708 before the beacon has been fully received.

When the decision module 706 determines that a data packet needs to be received, it may instruct the transceiver 708 to receive the entire beacon, wherein the entire beacon comprises an FCS. The decision module 706 may determine the integrity of the beacon according to the FCS, such as performing a cyclic redundancy check. If the beacon is incorrect, the decision module 706 instructs the power control module 712 to switch off the transceiver 708. The decision module 706 in this embodiment is described as a function block, and may actually be implemented by a logic circuit with complexity lower than the processor, cooperated with software. Similarly, the power control module 712 for switching the transceiver 708 may be circuit hardware, but may also be software programming.

On the other hand, when the decision module 706 determines that the data packet needs to be received and the beacon is correct, the time synchronization module 710 performs the local time synchronization according to the time stamp, and the transceiver 708 receives the data packet. After the transceiver 708 completes the reception of the data packet, the power control module 712 switches off the transceiver 708.

On the other hand, when the decision module 706 determines that there is no need to receive data packets, the processor 720 maintains in the state of sleep or inactive. The decision module 706 can then check whether the offset between the time stamp and the local time of the wireless device exceeds a threshold. If the offset does not exceed the threshold, the decision module 706 may instruct the time synchronization module 710 to perform the local time synchronization according to the time stamp, and then disables the transceiver 708. For example, the decision module 706 disables the transceiver 708 by instructing the power control module 712 to switch off the transceiver 708. In this embodiment, the threshold may be a time unit, such as a few microseconds or a few milliseconds.

On the other hand, when the offset exceeds the threshold, it is likely an error in beacon reception. In this case, the process falls back to the conventional way, wherein an entire beacon is received. The decision module 706 may instruct the transceiver 708 to fully receive the entire beacon, including a frame check sequence. The decision module 706 checks the frame check sequence to determine the integrity of the beacon. If the beacon is not received correctly, no process is required, and the decision module 706 may instruct the power control module 712 to switch off the transceiver 708 of the wireless device. On the other hand, if the beacon verification is correct, it means that a data packet needs to be received or that there is a time synchronization problem. In this case, the decision module 706 instructs the time synchronization module 710 to perform the local time synchronization according to the time stamp, and then wakes up the processor 720 to process the data packet reception through the transceiver 708. After receiving the data packet, the wireless device 700 or the processor 720 can enter the sleep mode or power saving mode again, and the power control module 712 also stops supplying power to the transceiver 708 to save power.

Based on the above embodiments, the technical effect of the invention is that it can save a sizable proportion of power consumption for wireless devices that are idle for a long time. The modules involved in the wireless device are described as function blocks, and may include more different functional modules in practice, which are not limited to the items listed in the embodiment, and these functional modules are not limited to being actually implemented by hardware circuits or programmable software.

It should be noted that in this paper, the terms "include", "include" or any other variation thereof are intended to cover non-exclusive inclusion, so that a process, method, article or device including a series of elements comprises not only those elements, but also other elements not explicitly listed, or for such a process, method. An element inherent in an article or device. Without further restrictions, the elements defined by the statement "including a . . . " do not exclude the existence of other same elements in the process, method, article or device including the elements.

the embodiments of the present application are described above in combination with the accompanying drawings, but the present application is not limited to the specific embodiments, which are only schematic rather than restrictive. Those skilled in the art, under the enlightenment of the present application and without departing from the scope protected by the purposes and claims of the present application. It can also be made in many forms, all of which fall within the scope of the protection of this application.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for wireless data reception, adaptable for a wireless device to receive data frames from an access point, comprising:
   enabling a transceiver of the wireless device at a target beacon transmission time;
   receiving only a first portion of a beacon, wherein a length of the first portion is less than a full length of the beacon, the first portion of the beacon comprising a time stamp and a traffic indication map (TIM);
   determining whether there is any buffered data packet pending for reception according to the TIM;
   in response to determining that there is no buffered data packet pending for reception according to the TIM;
   checking whether an offset between the time stamp and a local time of the wireless device exceeds a threshold; and
   in response to checking that the offset not exceeding a threshold value:
       performing a local time synchronization according to the time stamp, and
       then switching off the transceiver of the wireless device without receiving a remaining portion of the complete beacon; and
   in response to determining that there is a buffered data packet pending for reception according to the TIM:
       receiving the remaining portion of the complete beacon, wherein the remaining portion of the complete beacon comprises a frame check sequence;

verifying an integrity of the beacon according to the frame check sequence; and in response to verification of the integrity of the beacon failing, switching off the transceiver of the wireless device, wherein further in response to determining there is no buffered data packet pending for reception according to the TIM, and in response to checking that the offset exceeds the threshold, the method further comprises:

receiving the remaining portion of the complete beacon, wherein the remaining portion of the complete beacon comprises the frame check sequence;

verifying an integrity of the complete beacon according to the frame check sequence; and in response to verification of the integrity of the complete beacon failing, switching off the transceiver of the wireless device.

2. The method according to claim 1, wherein in response to the TIM indicating that a data packet is buffered for reception, and the integrity of the beacon is verified, the method further comprises:

performing a local time synchronization according to the time stamp;

receiving the data packet; and switching off the transceiver of the wireless device upon conclusion of receiving the data packet.

3. The method according to claim 1, wherein in response to the TIM indicating that there is no buffered data packet to receive, the offset exceeds the threshold, and the integrity of the complete beacon is verified, the method further comprises:

performing the local time synchronization according to the time stamp;

receiving the data packet; and switching off the transceiver of the wireless device upon conclusion of receiving the data packet.

4. The method according to claim 1, further comprising:

interpreting one or more element identifiers in the first portion to find out a TIM information element, wherein the TIM is a bit map in the TIM information element.

5. A wireless device for receiving data from a remote device, comprising:

a transceiver, for transmitting and receiving wireless signals;

a time synchronization circuit, configured to perform a local time synchronization; and a control circuit, coupled to the transceiver, configured to disable or enable the transceiver;

wherein the control circuit enables the transceiver at a target beacon transmission time to receive only a first portion of a beacon, wherein the beacon comprises the first portion and a second portion, wherein the first portion comprises a time stamp and a traffic indication map (TIM) and the second portion comprises a frame check sequence;

wherein the control circuit determines whether to receive a complete beacon, including the second portion in the remote device according to the traffic indication map; and wherein in response to the control circuit determining that an integrity of the beacon is not correct, according to the frame check sequence of the second portion, the control circuit is configured to disable the transceiver from receiving data packets;

wherein in response to determining that there is no buffered data packet pending for reception according to the TIM:

the control circuit checks whether an offset between the time stamp and a local time of the wireless device exceeds a threshold;

in response to checking that the offset not exceeding the threshold value:

the time synchronization circuit performs the local time synchronization according to the time stamp;

then switching off the transceiver of the wireless device without receiving the second portion of the complete beacon; and in response to checking that the offset exceeding the threshold, the transceiver receives the second portion of the complete beacon, the control circuit verifies the integrity of the complete beacon according to the frame check sequence; and in response to verification of the integrity of the complete beacon failing, the control circuit is configured to disable the transceiver, and in response to the integrity of the complete beacon being verified, the time synchronization circuit performs the local time synchronization according to the time stamp.

6. The wireless device according to claim 5, wherein:

when the control circuit determines that there is the buffered data packet in the remote device, the transceiver receives the second portion of the beacon;

the control circuit verifies an integrity of the complete beacon according to the frame check sequence, the complete beacon comprising both the first portion of the beacon and the second portion of the beacon; and wherein the control circuit is further configured to disable the transceiver, in response to the verification of the integrity of the complete beacon failing.

7. The wireless device according to claim 5, wherein:

in response to the control circuit determining that there is the buffered data packet in the remote device, the transceiver receives the second portion of the beacon;

the control circuit verifies the integrity of a complete beacon according to the frame check sequence, the complete beacon comprising both the first portion of the beacon and the second portion of the beacon; and in response to the integrity of the complete beacon being verified, the time synchronization circuit performs the local time synchronization according to the time stamp, and the wireless device enters a normal mode from a sleep mode.

8. A method for receiving a beacon from a remote device, applicable to a wireless device, comprising:

enabling a transceiver of the wireless device at a target time;

receiving only a first portion of the beacon, wherein the beacon comprises the first portion and a second portion, the first portion comprises a traffic indication signal, and the second portion comprises a frame check sequence;

determining whether there is a data packet buffered in the remote device for transmission to the wireless device according to the traffic indication signal; and in response to determining that there is no data packet buffered in the remote device for transmission to the wireless device, disabling the transceiver of the wireless device before the complete beacon has been received;

comparing a time stamp in the first portion and a local time of the wireless device to generate an offset; and in response to comparing that the offset is smaller than a threshold value:
    performing a local time synchronization according to the time stamp; and
    then switching off the transceiver of the wireless device without receiving a remaining portion of the complete beacon;
in response to comparing that the offset is not being smaller than the threshold value;
enabling the transceiver to receive the second portion of the complete beacon;
verifying an integrity of the complete beacon according to the frame check sequence; and
in response to the integrity of the beacon being verified, performing the local time synchronization according to the time stamp.

9. The method according to claim 8, further comprising:
when the traffic indication signal indicates the data packet is buffered in the remote device, completely receiving the beacon, wherein the beacon comprises a frame check sequence;

verifying an integrity of the beacon according to the frame check sequence; and
in response to verification of the integrity of the beacon failing, disabling the transceiver of the wireless device.

10. The method according to claim 8, further comprising:
in response to the traffic indication signal indicating the data packet is buffered in the remote device, receiving the complete beacon, wherein the first portion comprises a time stamp, and the beacon comprises a second portion comprising a frame check sequence;
verifying an integrity of the beacon according to the frame check sequence;
in response to the integrity of the beacon being verified, performing a local time synchronization according to the time stamp;
receiving the buffered data packet transmitted from the remote device; and
disabling the transceiver of the wireless device after the buffered data packet is received.

\* \* \* \* \*